Figure 1:
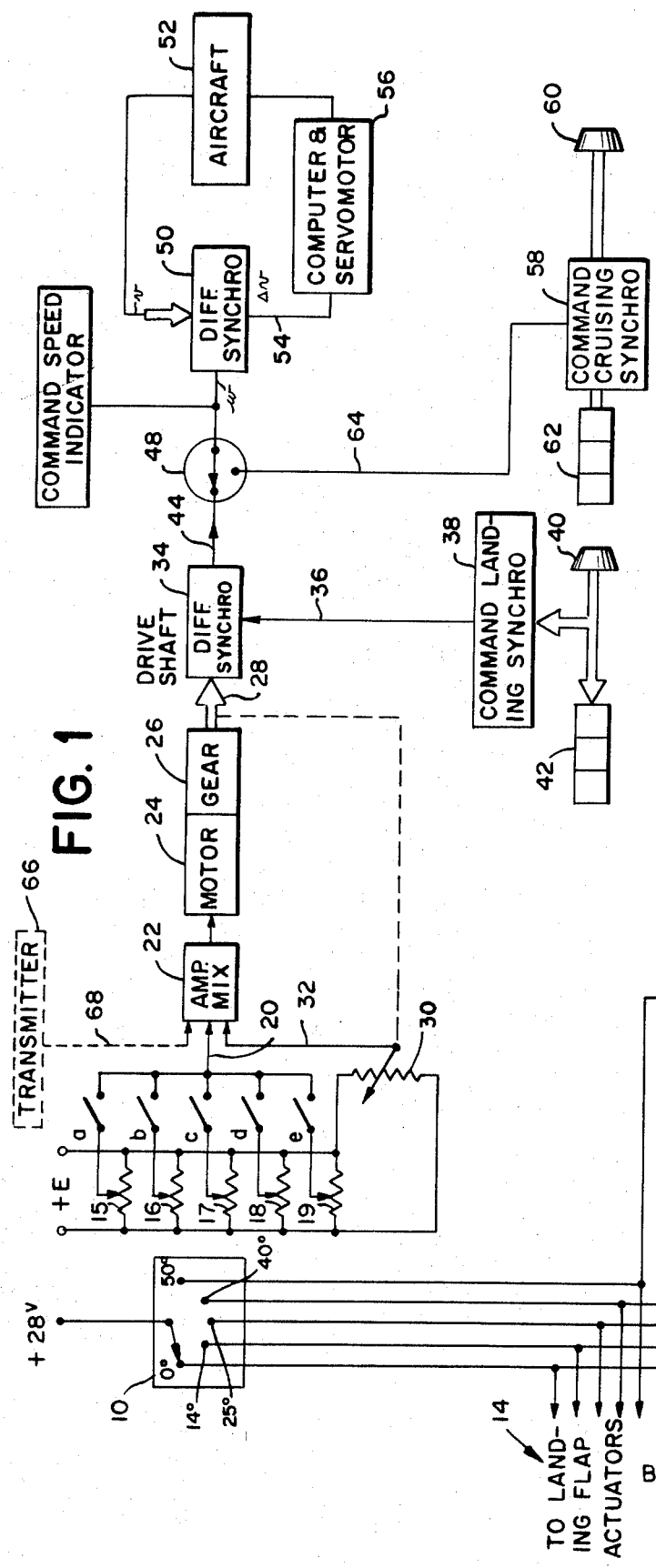

United States Patent
Buchholz et al.

[15] 3,690,598
[45] Sept. 12, 1972

[54] SPEED CONTROL FOR AIRCRAFT WITH EXTENSIBLE LANDING FLAPS

[72] Inventors: Hans-Dieter Buchholz, 9772 Oberuhldingen; Hans-Peter Reerink, 7758 Meersburg, both of Germany

[22] Filed: April 30, 1969

[21] Appl. No.: 820,439

[30] Foreign Application Priority Data
   Oct. 10, 1968    Germany..........P 18 02 243.0

[52] U.S. Cl. ............................................244/77 D
[51] Int. Cl. .................................................B64c 13/50
[58] Field of Search............244/77, 77 A, 77 D, 42.1

[56]            References Cited
            UNITED STATES PATENTS
3,104,083    9/1963    Kutzler..................244/42.1 X
3,448,948    6/1969    Reerink..................244/77 D FOREIGN PATENTS OR APPLICATIONS
765,697    8/1967    Canada..................244/77 D Primary Examiner—Milton Buchler
Attorney—Edward R. Hyde, Jr.

[57]            ABSTRACT

A speed controller for an aircraft is described which is adapted for regulating aircraft speed at a desired command speed and for automatically altering the command speed for particular aircraft landing weight in accordance with the degree of extension of the aircraft landing flaps.

6 Claims, 2 Drawing Figures

INVENTORS
HANS-DIETER BUCHOLZ
HANS-PETER REERINK

ATTORNEYS

SPEED CONTROL FOR AIRCRAFT WITH EXTENSIBLE LANDING FLAPS

The present invention relates to a speed controller for aircraft. The invention relates more particularly to a speed controller through which a speed regulating variable such as engine thrust is varied in a manner for controlling the aircraft speed with respect to ambient air upon extension of aircraft landing flaps.

During a landing approach, the landing flaps of an aircraft are extended for increasing the lift of the aircraft and for permitting the aircraft speed to be decreased below a value which is ordinarily maintained as a minimum safe speed when the flaps are not extended. A different minimum safe speed exists for each of the various positions of the extended landing flaps and this speed is dependent on the weight of the aircraft which is determinable in part from variable factors such as the number of passengers, the loaded fuel and the consumed fuel, etc. Depending on the weight of the aircraft for any one landing, a specific minimum speed exists when the landing flaps are fully extended. This minimum speed is then increased by a particular speed increment for each degree of landing flap retraction from the fully extended flap position. Moreover, a safety factor on the order of 30 percent is normally provided with respect to the theoretically permissible minimum speed.

In an aircraft speed controller wherein the airspeed is controlled by means which automatically regulate the airspeed at a command speed, the value of the command speed should be adjusted accordingly as the landing flaps are extended. This has previously been accomplished manually by the pilot. For a fully extended landing flap, the pilot would derive the safe landing speed for the associated aircraft weight from a table. He would then set an index on the speed indicator to this safe landing speed, below which the aircraft should not fall. The airspeed increments for the various positions of a partially extended landing flap are then mentally calculated by the pilot. As the landing flaps are extended, the command speed of the speed controller is then adjusted by the pilot for providing that at each extended position of the landing flaps the aircraft flies at a desired speed. These requirements for searching a table, mentally calculating speed increments, and the adjustment of the command speed represent an undesirable burden on the pilot, who is already fully occupied with other tasks during the critical landing operation. Nonetheless, the command speed adjustment is required since an extension of the landing flaps without a corresponding adjustment of the speed would result in a highly undesirable throttle movement. This undesired throttle movement would occur automatically because the speed controller functions to maintain the initial command speed regardless of the increased flow resistance introduced by the extended flaps. In the usual case, effecting a decrease in the command speed will further initially and undesirably throttle the fuel supply at a relatively high rate.

An improvement to a servo speed controller which is disclosed and claimed in copending U.S. Patent application Ser. No. 822,650, filed on May 7, 1969 and assigned to the assignee of this invention, comprises means for automatically operating on the servo loop during a period of time corresponding to an initial portion of an aircraft disturbance for compensating for the disturbance. There is disclosed in this patent application the provision of a control program which controls the aircraft according to predetermined empirical values independently of the servo control when specific aircraft disturbances occur or are exceeded.

It is an object of this invention to provide an improved form of aircraft speed controller.

Another object of the invention is to provide an improved aircraft speed controller of the type wherein previously established values are provided for effecting control of the speed of the aircraft during a landing operation.

Another object of the invention is to provide a speed controller for an aircraft having extensible landing flaps in which an automatic adjustment of a command speed is effected upon extension of the landing flaps.

Another object of the invention is to provide a speed controller adapted for compensating for the aircraft weight with extended flaps.

In accordance with a feature of this invention, a speed controller for an aircraft which is adapted for regulating airspeed at a command speed includes a means for providing an adjustable command speed signal, in accordance with a desired landing speed, a second means automatically adjustable with landing flaps of the aircraft for generating a second signal having a magnitude in accordance with the extension of the landing flaps, and means for combining the second signal and the command speed signal for providing a resultant command signal for the speed controller. In a particular arrangement the desired landing speed is provided by an adjustable command speed transmitter and is adjusted to a value for providing the minimum speed with ordinary safety factors for the landing weight of the aircraft. The signal increments resulting from the extended position of the landing flaps and which decrease to zero in the case of a fully extended landing flap are provided by a second command speed transmitter and are automatically added to the command speed signal from the first transmitter for control of the speed regulator. Further adjustment of the command speed by the pilot is therefore not required. The speed controller according to features of this invention therefore compensates for the landing weight of the aircraft while providing an automatic and continuous variation of the airspeed in accordance with the position of the landing flaps.

In an embodiment of the invention, the second transmitter comprises a plurality of potentiometers each having a voltage applied thereto and each of which is associated with a particular position of the landing flaps. Wiper contacts of the potentiometers are selectively coupled to an input of a mixer-amplifier synchronously with an adjustment of a landing flap switch. The mixer-amplifier drives a motor with position feedback to the input of the mixer-amplifier. The position of the motor shaft is then proportional to the signals applied to the input of the mixer-amplifier. This arrangement serves to add the signals from the first and second command speed transmitter units in that the first command signal corresponding to the landing speed is applied to a third input of the mixer-amplifier. In such a case, rotation of the motor shaft is proportional to the sum of the first command signal and of the second command signal derived from the one voltage divider.

The rotor of a first differential synchro is coupled to and adapted to be driven by the motor, while the stator of the first differential synchro obtains a three-phase signal from a second synchro which is manually rotatable in accordance with the extended flap landing speed.

In accordance with a further feature of the invention, the three-phase output signal of the first differential synchro is supplied to a stator of a third synchro, the rotor of the third synchro is rotatable in response to the airspeed of the aircraft and supplies an output signal in response to an airspeed deviation from the command landing speed.

It is desirable to enable the pilot to adjust the command landing speed while the aircraft is still flying at cruising speed. This is accomplished in accordance with another feature of this invention by the provision of a fourth synchro and a switch coupled between the first differential synchro, the fourth synchro, and the third synchro. The signal from the first differential synchro and a three-phase signal from the fourth manually adjustable synchro are alternatively applied to the third synchro. The fourth synchro then establishes for the aircraft speed controller during cruising flight a command speed corresponding to the desired cruising speed. During cruising flight the pilot can then adjust the command landing speed with the second manually rotatable synchro, but which command speed does not become operative until the pilot operates the switch. When initiating the landing approach, the switch is operated so that command speed control is effected from the first differential synchro.

Figure 2:
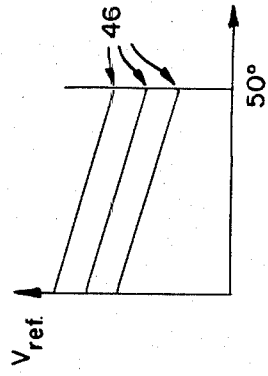

These and other objects and features of the invention will become apparent with reference to the following specifications and the drawings, wherein:

FIG. 1 is a schematic diagram partly in block form illustrating a speed controller constructed in accordance with features of the invention; and FIG. 2 is a diagram illustrating the dependence of the required minimum speed of the aircraft on the extension angle of the landing flaps at different aircraft landing weights.

Referring now to FIG. 1, a landing flap switch 10 which is shown as a selector disc includes a moving contact arm 12 which is rotatable to contact a one of five stationary contacts referenced as 0°, 14°, 25°, 40°, and 50° according to the respective extension angle of the landing flaps. The stationary contacts are coupled to servo motors for adjustment of the landing flaps through leads 14 and effect a corresponding setting of the landing flaps. The stationary contacts of the switch 10 are also coupled to relay coils referenced as A, B, C, D, and E. The selection of a particular flap extension by rotation of the switch contact arm simultaneously energizes an associated one of the relay coils and causes a closure of contacts associated with that relay coil. A constant voltage E is applied across five parallel coupled potentiometers referenced as 15, 16, 17, 18, and 19. A wiper arm of each of the five potentiometers is adjustable individually and is coupled to an input 20 of a mixer-amplifier 22 through the contacts A, B, C, D, and E. The mixer-amplifier 22 drives a motor 24 which rotates a driven shaft 28 through a gear 26. A wiping element of a potentiometer 30 also having a voltage E applied thereto is adjustable together with the driven shaft 28. The wiper of the potentiometer 30 is coupled by an input lead 32 to the mixer-amplifier 22 and provides a position feedback. The angle of rotation of the shaft 28 is proportional to the signal applied to the input 20 of the mixer-amplifier 22 due to position feedback.

A rotor of a first differential synchro 34 is coupled to and rotated by the shaft 28. A three-phase signal is derived from a second synchro 38 and is applied to a stator of the first synchro over a lead 36. The synchro 38 is manually adjustable by means of an adjustable knob 40. This adjustment is visually displayed by a digital indicating instrument 42. A summation signal is derived at a three-wire lead 44 from the differential synchro 34. The pilot adjusts the minimum command speed $V_{ref}$ for a fully extended landing flap at $\Delta = 50°$ with consideration for the aircraft landing weight, by the setting knob 40 of the synchro 38 and as stated, this value is displayed by the digital indicating instrument 42. The diagram of FIG. 2 illustrates the curves of the minimum landing speed $V_{ref}$ in dependence on the landing flap angle with different aircraft landing weights as parameters. As can be seen, the curves are linear curves having substantially the same slope. The landing speed is adjusted by a knob 40 according to either of the points 46 shown in the curve depending on the landing weight of the aircraft. Increments to this landing speed which are obtained for retracting landing flaps corresponding to the position of the landing flap switch 10 on 0°, 14°, 24°, or 40° are substantially independent of this adjustment and are represented electrically by the voltages obtained from the potentiometers 15–19. These voltages are adjusted on the potentiometers 15–19 according to the slope of the characteristic in FIG. 2. The rotor of the first differential synchro 34 is then rotated accordingly.

A three-phase signal occurs on output lead 44 of the first differential synchro 34. This signal corresponds to the command speed value $V_{ref}$ plus the increments of speed formed by the command landing speed servo 38 and the flap setting increments as described. This signal is supplied to the stator of a third synchro 50 through a switch 48. The rotor of this synchro 50 is rotatable in response to the actual speed of the aircraft which is represented by the block 52. A signal which is proportional to the deviation $\Delta v$ is derived from a rotor of the synchro 50 through a lead 54. An input to the synchro 50 comprises the actual airspeed with respect to ambient air and the second input from synchro 34 represents a resultant command speed for landing operations. The deviation $\Delta v$ which is provided as an output signal from the synchro 50 is applied to a computer 56, not illustrated in detail, which supplies a signal through a servo motor or servo motors, not shown, for effecting a change in the engine thrust by an adjustment in the fuel supply throttle.

A fourth synchro 58 is provided and adjustable by a setting knob 60. The position of this synchro 58 is displayed on a digital indicating instrument 62. This synchro supplies a three-phase signal over a lead 64 and which, through switch 48, is selectively applied to the third synchro 50 as an alternative to the application of the signal from the first differential synchro 34. The following operation thus occurs: during cruising flight, the synchro 58 is coupled to the input of the third synchro 50 through the switch 48. The desired flight cruising speed is then adjusted as the command speed for the controller by the servo 58. When the controller is operated responsive to servo 58, the pilot is free to adjust the command landing speed with the synchro 38 and the indicating instrument 42 by the knob 40 for fully extended landing flaps. This signal however is not effective since the synchro 34 is decoupled during cruising flight from the controller by the switch 48. When the pilot initiates a landing approach he operates the switch 48 for coupling synchro 34 to the controller and for decoupling the cruising speed synchro 58. The output signal from synchro 34 therefore becomes effective at the synchro 50 to provide a command speed for the speed controller. When extending the landing flaps, the command value of the speed controller varies stepwise automatically according to one of the characteristics of FIG. 2, depending on which of the points 46 has been adjusted by the setting knob 40 and the indicating instrument 42.

In an alternative embodiment of the invention, the command landing speed for fully extended flaps is provided by a transmitter 66 as an electric voltage. The transmitter 66 is shown illustrated in dotted lines in FIG. 1. A signal from transmitter 66 is applied to the mixer-amplifier 22 over a lead 68 and is combined with the signal at input 20. Rotation of the driven shaft 28 is then proportional to the sum of the two signals from the transmitter 66 and one of the potentiometers 15–19.

While I have illustrated and described a particular embodiment of my invention, it will be understood that various modifications may be made therein without departing from the spirit of the invention and the scope of the appended claims.

What is claimed is:

1. In an aircraft having extensible landing flaps and a speed controller arranged for sensing deviations $\Delta v$ in airspeed $v$ from a command speed $w$ and for altering airspeed $v$ in a manner for reducing the deviations, the improvement comprising means for selectively providing a first command signal representative of a desired nominal airspeed for a predetermined position of the landing flaps, means automatically adjustable with the flaps for providing a second command signal representative of one of a plurality of predetermined different positions of the landing flaps and means for combining said first and second signals and applying a resultant thereof to the speed controller as a landing command signal for controlling the speed of the aircraft during a landing operation.

2. The speed controller of claim 1 wherein said means for providing a second command signal comprises a plurality of potentiometers coupled in parallel to a voltage source E, each of said potentiometers associated with a position of said landing flaps and having a wiper contact thereof, a mixer-amplifier, means for selectively coupling a wiper contact to said mixer-amplifier synchronously with the adjustment of the flap to said associated position, a motor, means coupling an output signal from said mixer-amplifier to said motor for exciting said motor, and means providing a position feedback from said motor to said mixer-amplifier.

3. The speed controller of claim 2 wherein means apply said first command signal to said mixer-amplifier.

4. The speed controller of claim 2 wherein said means for providing said first signal comprises a synchro manually rotatable in accordance with the landing speed.

5. The speed controller of claim 4 wherein said signal combining means comprises a differential synchro, a third synchro having a stator, means coupling a signal from said differential synchro to the stator of said third synchro, the rotor of said third synchro rotatable in response to the airspeed $v$ of the aircraft whereby said third synchro provides an output signal $\Delta v$ in response to a deviation of the airspeed $v$ from the command signal $w$.

6. The speed controller of claim 5 including a fourth manually adjustable synchro for providing an output signal representative of a desired cruising speed and switching means for alternatively coupling signals from said first and fourth synchros to said stator of said third synchro.

* * * * *